Patented Feb. 16, 1943

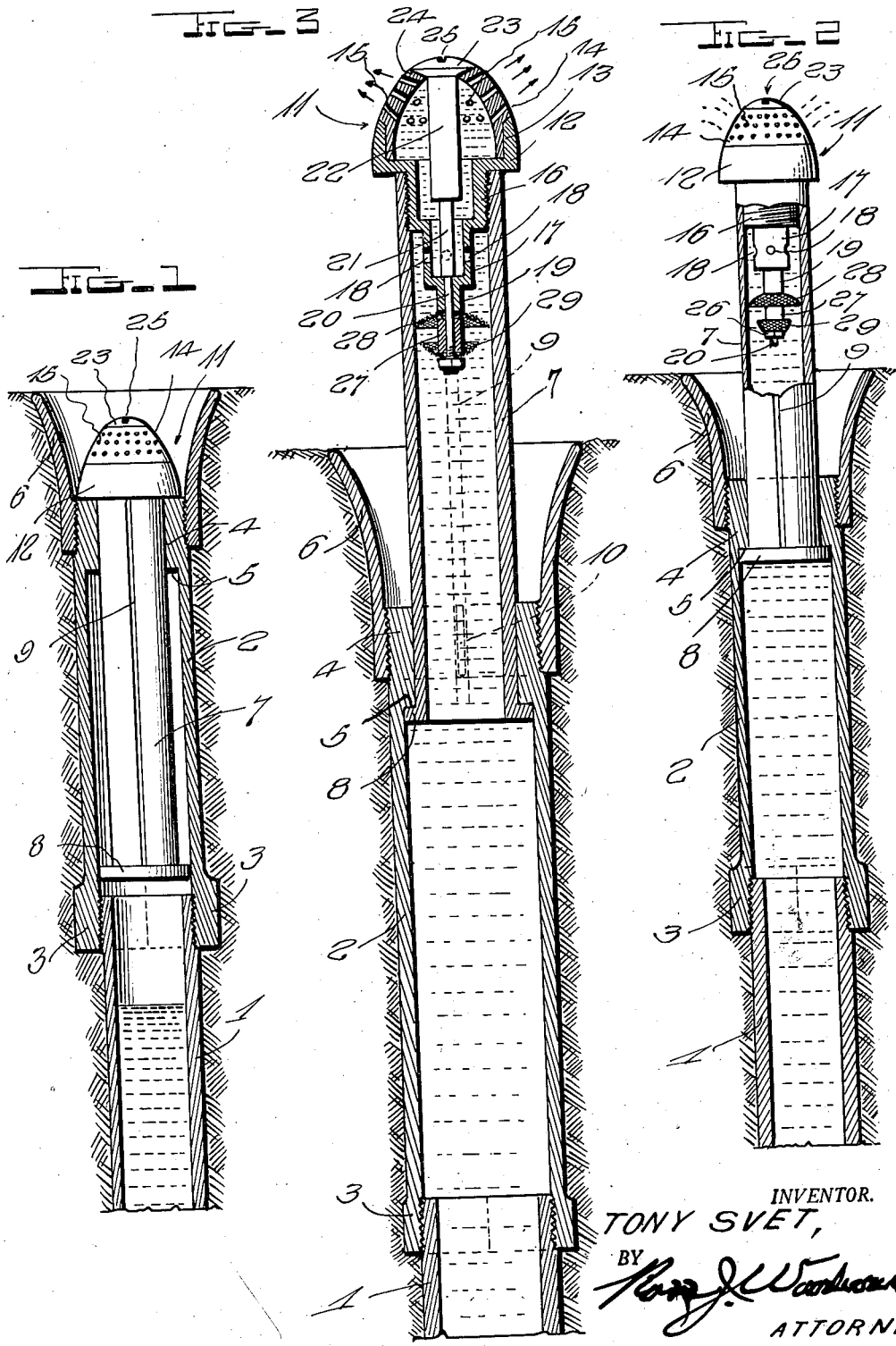

2,311,266

UNITED STATES PATENT OFFICE 2,311,266

LAWN SPRINKLER

Tony Svet, Cleveland, Ohio

Application November 13, 1941, Serial No. 418,964

3 Claims. (Cl. 299—61)

This invention relates to a lawn sprinkler of the type wherein a number of sprinklers are connected with an underground conduit in such spaced relation to each other that, when a valve is opened to permit flow of water through the conduit, sprays of water will be discharged upwardly from the sprinklers and an entire lawn or a large section thereof watered at one time.

It is one object of the invention to provide a sprinkler of this character having a vertically disposed tubular body of a length adapting it to be buried in the ground with its lower end connected with a branch pipe or nipple leading from the conduit, a sleeve being mounted in the body for vertical sliding movement from retracted position to raised position and having a nozzle at its upper end through which water is discharged in a spray when the water is turned on and the sleeve shifted upwardly by the force of the water.

Another object of the invention is to provide a sprinkler of this type wherein the nozzle has a shank removably mounted within the sleeve and constituting an inlet for water to be discharged from the nozzle, the shank having screens at its lower end for catching any dirt or foreign matter and holding same until the nozzle is detached from the sleeve. It will thus be seen that dirt may be caught and removed with the nozzle and the sprinkler easily cleaned.

Another object of the invention is to provide the sprinkler with a spray head or nozzle which is simple in construction and can be very easily taken apart for thorough cleaning when removed from the sleeve.

In the accompanying drawing:

Fig. 1 is a view showing the sprinkler partially in vertical section and partially in side elevation.

Fig. 2 is a view similar to Fig. 1, showing the sleeve projected upwardly to operative position.

Fig. 3 is a vertical sectional view showing the sleeve projected upwardly to operative position.

This improved lawn sprinkler is adapted for use in connection with a system in which a number of the sprinklers are embedded in the ground and each connected with a nipple or branch pipe 1 extending upwardly from a water pipe embedded in the ground. When a valve controlling flow of water through the water pipe is opened, flow of water therethrough will be effected to be discharged upwardly from the sprinklers in the form of fountain sprays which not only water the lawn but are also very attractive in appearance.

Each of the sprinklers has a tubular body 2 of such length that when its lower end is screwed upon the upper end of the nipple 1, the upper end of the body will be below the surface of the ground. The lower end of the body is externally thickened and provides a wrench-engaging portion 3 in order that the body may be engaged by a wrench and tightly screwed into place when it is applied to the nipple. The upper end of the body is internally thickened, as shown at 4, to provide an annular abutment shoulder 5, and this upper end of the body is externally threaded to receive the internally threaded lower end of a cup-shaped collar 6 which is flared upwardly and has its upper end level with the ground. This collar forms a seat for a spray head and also prevents the soil from caving in about the sprinkler as well as preventing the spray nozzle thereof from moving upwardly when water is turned on. It also prevents the nozzle from becoming clogged with dirt.

A sleeve 7 extends longitudinally in the body 2 and is of such diameter than the internally thickened portion 4 of the body fits snugly about the sleeve. This sleeve is slidable vertically through the body and, at its lower end, is formed with an outstanding flange 8 for engaging the shoulder 5 and limiting upward movement of the sleeve. A groove 9 extends longitudinally in the sleeve and into this groove engages a fin 10 which projects from the thickened portion 4 and prevents the sleeve from turning in the body. A spray head or nozzle 11 is carried by the sleeve at the upper end thereof and has a cup or socket 12 into which fits the reduced lower end portion 13 of a cap 14. This cap tapers upwardly and is formed with a large number of perforations 15 through which water is discharged in the form of a fountain spray when the sprinkler is in operation. A hollow externally threaded shank 16 extends downwardly from the cup and is screwed into the internally threaded upper end portion of the sleeve in order that the nozzle may be removably applied to the sleeve after the sleeve has been passed upwardly through the body. A hollow neck 17, formed with side openings 18, extends downwardly from the shank and carries a depending stem 19 through which a bore is formed to receive the stem 20 carried by the shank 21 of a fastener 22. This fastener extends longitudinally through the nozzle and, at its upper end, is formed with a head 23 which seats against the beveled walls of an opening 24 and is formed with an eye or groove 25, so that the fastener may be turned with a screw driver to tighten the nut 26 at the lower end of its stem 20.

The stem 20 projects downwardly from the stem 19 and carries a spacer 27 at upper and lower ends of which are disposed screens 28 and 29. These screens are of concavo-convex formation, the upper screen curving downwardly and the lower screen curving upwardly, and it should be noted that the upper screen is of greater diameter than the lower screen and has its margins in engagement with walls of the sleeve 7. Therefore, the screens serve to hold back dirt and other foreign matter which would be liable to clog the nozzle and any dirt falling from the upper screen will be caught in the lower screen. The screens are firmly clamped against ends of the spacer and held in proper spaced relation to each other by the spacer when the nut is tightened. When the nozzle is unscrewed from the sleeve and the nut removed, the nozzle may be easily taken apart for cleaning and repairs, and then reassembled for use.

When the water is turned on, the pressure forces the sleeve upwardly to raised position, in which water will be sprayed over a large area of a lawn, and, when the water is shut off, the weight of the sleeve causes it to move downwardly to a retracted position, in which position it is below the surface of the lawn. The sprinkler will thus be out of sight when not in use and, also, not constitute obstructions which would interfere with a person walking on the lawn.

Having thus described the invention, what is claimed is:

1. In a sprinkler, a tubular body of a length adapting it to be buried in the ground and have its lower end connected with a conduit, a sleeve slidable vertically in the body from retracted position to raised position, a nozzle carried by the upper end of said sleeve and having a shank detachably connected with the sleeve and provided with a neck extending longitudinally in the sleeve in spaced relation to the wall thereof, and upper and lower screens mounted on the lower end of the neck, the lower screen having its marginal edge spaced from the wall of the sleeve and the upper screen being of appreciably greater diameter than the lower screen and having its margins contacting with walls of the sleeve.

2. In a sprinkler, a tubular body of a length adapting it to be buried in the ground and having its lower end connected with a conduit, a sleeve slidable vertically in the body from retracted position to raised position, a nozzle at the upper end of the sleeve, said nozzle having a shank detachably connected with the sleeve and provided with a neck extending longitudinally in the sleeve in spaced relation to the wall thereof, and upper and lower screens mounted on the inner end of the neck, said screens being of concavo-convex formation and spaced vertically from each other, the lower screen being spaced from the wall of the sleeve and having its concave surface presented upwardly, and the upper screen having its concave surface presented downwardly and being of appreciably greater diameter than the lower screen and having its margins bearing against wall of the sleeve.

3. In a sprinkler, a tubular body of a length adapting it to be buried in the ground and have its lower end connected with a conduit, a sleeve slidable vertically in the body from retracted position to raised position, a nozzle at the upper end of the sleeve consisting of a cup having a hollow shank detachably screwed into the upper end of the sleeve and a hollow neck extending downwardly from the shank and formed with inlet openings, a stem depending from the lower end of the neck and bored longitudinally, a perforated cap carried by the cup, a fastener for said cap extending longitudinally thereof and provided with a shank extending longitudinally through the neck of the cup and terminating in a stem passing through the bore of the stem of the cup and downwardly therefrom, upper and lower screens about the protruding lower portion of the stem of said fastener, a spacer about the stem of the fastener disposed between the screens and holding the screens in vertical spaced relation to each other, and a nut threaded on the lower end of the stem of the fastener and tightly holding the screens and the spacer clamped together, said screens projecting laterally from the spacer and the stem of the cup, and the upper screen having its margins bearing against the wall of the sleeve.

TONY SVET.